United States Patent
Stojanovski et al.

(10) Patent No.: US 8,462,728 B2
(45) Date of Patent: Jun. 11, 2013

(54) METHOD AND WIRELESS SYSTEM FOR ACHIEVING LOCAL ANCHORING OF A MOBILE NODE

(75) Inventors: Saso Stojanovski, Paris (FR); Barnaba Barnowski, Calgary (CA)

(73) Assignee: Apple Inc., Cupertino, CA (US)

( * ) Notice: Subject to any disclaimer, the term of this patent is extended or adjusted under 35 U.S.C. 154(b) by 1200 days.

(21) Appl. No.: 12/035,501

(22) Filed: Feb. 22, 2008

(65) Prior Publication Data
US 2009/0163203 A1 Jun. 25, 2009

(30) Foreign Application Priority Data
Dec. 24, 2007 (EP) ..................................... 07301740

(51) Int. Cl.
*H04W 4/00* (2009.01)
*H04W 36/00* (2009.01)

(52) U.S. Cl.
USPC ........ 370/331; 370/328; 370/338; 455/432.1; 455/433; 455/436

(58) Field of Classification Search
USPC ............ 370/331, 328, 338; 455/432.1, 432.3, 455/433, 435.1, 435.2, 436
See application file for complete search history.

(56) References Cited

U.S. PATENT DOCUMENTS

| | | | |
|---|---|---|---|
| 7,672,288 B1 * | 3/2010 | Iartym ........................... | 370/349 |
| 7,870,601 B2 * | 1/2011 | Pandey et al. ..................... | 726/2 |
| 2005/0074015 A1 * | 4/2005 | Chari et al. .................... | 370/400 |
| 2006/0153124 A1 * | 7/2006 | Kant et al. ..................... | 370/328 |
| 2006/0246920 A1 * | 11/2006 | Shim .......................... | 455/456.2 |
| 2007/0008931 A1 * | 1/2007 | Yamamoto et al. ........... | 370/331 |
| 2007/0021120 A1 * | 1/2007 | Flore et al. .................... | 455/436 |

(Continued)

FOREIGN PATENT DOCUMENTS
WO     WO 2007039757 A2 *  4/2007

OTHER PUBLICATIONS

3GPP TS 23.402 V1.3.0 (Sep. 2007), 3rd Generation Partnership Project; Technical Specification Group Services and System Aspects; Architecture Enhancements for non-3GPP accesses (Release 8), pp. 1-84.

(Continued)

*Primary Examiner* — Christopher M Brandt
(74) *Attorney, Agent, or Firm* — Meyertons, Hood, Kivlin, Kowert & Goetzel, P.C.

(57) ABSTRACT

The invention involves a method for achieving local anchoring of a mobile node (MN) in a wireless system comprising a plurality of radio access networks (RANs), a plurality of gateways (GWs), each capable of acting as a serving gateway, and a home server, with each RAN being connected to a GW, and a user profile relating to the MN being stored in the home server. According to the method, when the mobile node has a radio link with a first RAN which is connected to a first GW, the first GW is assigned as a local anchor for the MN, and the user profile relating to the MN in the home server is updated with an indication of the first GW. And when the mobile node moves to a second RAN which is also connected to the first GW, the indication of the first GW is retrieved from the user profile relating to the MN in the home server, and the first GW assigned is kept as a local anchor for the MN, based on the retrieved indication of the first GW.

22 Claims, 4 Drawing Sheets

U.S. PATENT DOCUMENTS

| | | | | |
|---|---|---|---|---|
| 2007/0127495 | A1* | 6/2007 | de Gregorio et al. | 370/395.52 |
| 2007/0159976 | A1* | 7/2007 | Dekeyzer et al. | 370/236 |
| 2007/0206539 | A1* | 9/2007 | Yegani et al. | 370/331 |
| 2008/0039077 | A1* | 2/2008 | Yang et al. | 455/432.1 |
| 2008/0112395 | A1* | 5/2008 | Zhu et al. | 370/352 |
| 2008/0267199 | A1* | 10/2008 | Smith et al. | 370/401 |
| 2009/0040964 | A1* | 2/2009 | Zhao et al. | 370/328 |
| 2009/0046655 | A1* | 2/2009 | Zhao et al. | 370/331 |
| 2009/0073933 | A1* | 3/2009 | Madour et al. | 370/331 |
| 2009/0086675 | A1* | 4/2009 | Yamamoto et al. | 370/331 |
| 2009/0109986 | A1* | 4/2009 | Zhao et al. | 370/401 |
| 2009/0111458 | A1* | 4/2009 | Fox et al. | 455/422.1 |
| 2009/0201878 | A1* | 8/2009 | Kotecha et al. | 370/331 |
| 2010/0226313 | A1* | 9/2010 | Sugimoto et al. | 370/328 |

OTHER PUBLICATIONS

3GPP TS 23.401 V1.2.1 (Sep. 2007), 3rd Generation Partnership Project; Technical Specification Group Services and System Aspects; GPRS Enhancements for E-UTRAN access (Release 8), pp. 1-87.

3GPP TS 23.060 V7.5.0 (Sep. 2007), 3rd Generation Partnership Project; Technical Specification Group Services and System Aspects; General Packet Radio Service (GPRS); Service description; Stage 2 (Release 7), pp. 1-216.

Internet Draft, draft-ietf-netlmm-proxymip 6-01.txt, "Proxy Mobile IPv6," pp. 1-49, published by the Internet Engineering Task Force on Jun. 18, 2007.

RFC 3775, "Mobility Support in IPv6," pp. 1-165, published by the Internet Engineering Task Force in Jun. 2004.

* cited by examiner

METHOD AND WIRELESS SYSTEM FOR ACHIEVING LOCAL ANCHORING OF A MOBILE NODE

CROSS-REFERENCE TO RELATED APPLICATION

This claims priority under 35 U.S.C. §119 to EP Patent Application No. EP 07301740.2, filed Dec. 24, 2007, which is hereby incorporated by reference.

BACKGROUND OF THE INVENTION

The present invention relates to anchoring of a mobile node in a wireless system.

Such anchoring is needed in a wireless system comprising a plurality of radio access networks having, for example, heterogeneous access technologies. It is particularly needed when handling mobility in such a wireless system.

As a non limitative example, such anchoring is provided in evolved system architectures which are in the process of standardization in the 3GPP (3rd Generation Partnership Project) and 3GPP2.

In particular, anchoring is provided in the EPS (Evolved Packet System), detailed in the technical specifications 3GPP TS 23.402 V1.3.0 and 3GPP TS 23.401 V1.2.1, both published in September 2007, and which make use of a network-based mobility management mechanism, such as Proxy MIP or PMIP as defined in the Internet-Draft, draft-ietf-netlmm-proxymip6-01.txt, "Proxy Mobile IPv6", published on Jun. 18, 2007 by the IETF (Internet Engineering Task Force) or GTP (GPRS Tunnelling Protocol, where GPRS stands for General Packet Radio Service) as defined for instance in the technical specification 3GPP TS 29.060 V7.5.0 published in September 2007.

FIG. 1 illustrates anchoring of a mobile node MN in an EPS system where PMIP is used in a non-hierarchical manner. It will be noted that GTP or any other network-based mobility management mechanism could be suitable as well. This system is a simple wireless network comprising two radio access networks (RANs) RAN1 and RAN2, a home gateway H-GW, an authenticator Auth and a home authentication authorization and accounting server H-AAA.

In the illustrated example, RAN1 and RAN2 each comprise a mobile access gateway (MAG) functionality (also referred to as the proxy mobility agent (PMA) functionality in some earlier versions of the above mentioned Internet-Draft "Proxy Mobile IPv6"). They are thus capable of performing the signaling and of doing the mobility management on behalf of the mobile node MN. As to the H-GW, it comprises a local mobility anchor (LMA) functionality (also referred to as the home agent (HA) functionality in some earlier versions of the above mentioned Internet-Draft "Proxy Mobile IPv6" because of its similarity with the HA functionality defined in the Request for Comments RFC 3775 "Mobility Support in IPv6" published in June 2004 by the IETF (see section 8.4 in particular)).

The MN perceives simple IP (Internet Protocol) service and is assigned a home address HoA by the LMA functionality of the H-GW, as defined in the above mentioned publications.

In this scenario, when the MN, having a radio link with RAN1, attaches to the system of FIG. 1, it is authenticated with the H-AAA via the authenticator Auth. During the access authentication procedure, e.g. by the H-AAA and/or by Auth, H-GW is dynamically assigned to the MN.

The MN is then registered with the H-GW. This can be achieved by using the MAG functionality of RAN1, which sends a binding update message to H-GW on behalf of the MN. More detail on the binding update message can be found in the above mentioned Internet-Draft "Proxy Mobile IPv6" (see section 6.9.1 in particular).

After those operations, the H-GW can be considered as the assigned mobility anchor for the MN. And connectivity is established, in the form of a PMIP tunnel 2 between RAN1 and H-GW.

Afterwards, the MN moves to RAN2, meaning that a new radio link is opened between the MN and RAN2, whereas the radio link with RAN1 may be closed. If a communication was held by the MN with RAN1, it must then continue with RAN2.

When the MN moves to RAN2, a MN context containing all relevant information about the communication and about the manner traffic is routed within the system (e.g. security information, an address of the H-GW, etc.) is transferred from the source RAN1 to the target RAN2. This transfer is made possible by the presence of a context transfer (CT) interface between RAN1 and RAN2, which can be a direct interface 1 or which can go through other devices, such as one or several mobility management entities (MMEs).

After the context transfer, RAN2, by virtue of its MAG functionality, can establish connectivity to H-GW, for instance by sending a PMIP binding update message to the H-GW. The MN's communication can then go on via RAN2, as a PMIP tunnel 2 is thus created between RAN2 and H-GW.

FIG. 2 illustrates another anchoring of a mobile node MN in an EPS system where PMIP is used in a hierarchical manner. In this example also, GTP or any other network-based mobility management mechanism could be suitable as well.

In this hierarchical scenario, the anchoring is with a visited serving gateway rather than with the home gateway. The visited serving gateway is thus the one that contains the LMA functionality facing the radio access networks each including a MAG functionality. In addition, it contains a MAG functionality facing the H-GW.

The hierarchical scenario is typically used in roaming scenarios because it minimizes mobility related signaling across the roaming boundary. In addition, anchoring in the visited serving gateway allows for continuity of lawful intercept of user's traffic.

The system of FIG. 2 comprises three radio access networks, among which RAN1 and RAN2 share a context transfer (CT) interface (direct interface 4 or through one or several MMEs), whereas RAN2 and RAN3 do not have a context transfer (CT) interface therebetween.

As an example, RAN1 may be a 3GPP radio access network comprising one or several eNode-B (eNB) and RAN2 may be a non-3GPP radio access network (e.g. Wimax, CDMA2000, etc.).

It is assumed that the MN, having a radio link with RAN1, first attaches to the visited subsystem to which the gateway V-GW1 belongs. It is authenticated with the H-AAA via the authenticator Auth1. During the access authentication procedure, e.g. by the H-AAA and/or by Auth1, H-GW is dynamically assigned to the MN.

Moreover, Auth1 selects V-GW1 as a local mobility anchor. It also provides V-GW1 with an MN identifier and a H-GW address and sends a V-GW1 address to RAN1.

For registration of the MN, RAN1, which has a MAG functionality, establishes connectivity to V-GW1 on behalf of the MN, for instance by sending a binding update message to V-GW1. V-GW1 then establishes connectivity to H-GW, for instance by sending a binding update message to H-GW.

This initial attachment procedure substantially corresponds to the one detailed in section 5.4.2.4.3 of the above mentioned TS 23.402, where MN corresponds to the UE (User Equipment), V-GW1 is the Serving GW and H-GW is the PDN (Packet Data Network) GW.

At the end of this procedure, PMIP tunnels 3 and 5 are established between RAN1 and V-GW1 on the one hand, and V-GW1 and H-GW on the other hand. Those PMIP tunnels ensure connectivity between the MN and H-GW.

When the MN moves to RAN2, a V-GW1 address is transferred onto the CT interface 4 from RAN1 to RAN2, as part of the MN context. The target RAN2 can then register with V-GW1, rather than with another visited serving gateway, such as V-GW2.

As a result, a PMIP tunnel 3 between RAN2 and V-GW1 as well as a PMIP tunnel 5 between V-GW1 and H-GW can be used for carrying traffic to and from the MN.

A problem occurs however when the MN moves between radio access networks which are not connected through a CT interface (directly or through one or several MMEs), such as RAN2 and RAN3 of FIG. 2.

Indeed, assuming that the MN has a radio link with RAN2 and then moves to RAN3, there is no existing means for allowing the target RAN3 to register with the same visited serving gateway which was used by the source RAN2, namely V-GW1. Instead, another visited serving gateway which can belong to another subsystem, namely V-GW2, is assigned as a new local anchor for the MN.

There is a need to keep the same visited serving gateway as a local anchor even when the MN moves between base stations having no context transfer interface therebetween. This need is particularly acute for handling traffic to and from roaming users. If this need could be met, it would also avoid signaling to be transmitted and processed as far away as the home gateway H-GW.

The present invention fills this need.

SUMMARY OF THE INVENTION

The invention involves a method for achieving local anchoring of a mobile node in a wireless system comprising at least first and second radio access networks, at least first and second gateways, each of the first and second gateways being capable of acting as a serving gateway, and a home server. In this wireless system, each of the first and second radio access networks is connected to the first gateway and the second radio access network is also connected to the second gateway. The mobile node initially has a radio link with the first radio access network, with a user profile relating to the mobile node being stored in the home server. Within the context of this wireless system, the method comprises the following steps:

assigning the first gateway as a local anchor for the mobile node;

updating the user profile relating to the mobile node in the home server with an indication of the first gateway;

and when the mobile node moves to the second radio access network, retrieving the indication of the first gateway from the user profile relating to the mobile node in the home server; and keeping the first gateway assigned as a local anchor for the mobile node, based on the retrieved indication of the first gateway.

Due to the storage in the home server of an indication (e.g. an address) of the gateway assigned as a local anchor for the mobile node, and its retrieval when the mobile node has moved to the second radio access network, the local anchor for the mobile node can be kept unchanged.

This mode of operation is possible even when the first and second radio access networks have no context transfer interface therebetween.

As a consequence, traffic to and from roaming users can be allowed. Also, mobility related signaling towards the home gateway can be avoided.

The steps of assigning the first gateway as a local anchor for the mobile node, updating the user profile relating to the mobile node in the home server with an indication of the first gateway and/or retrieving the indication of the first gateway from the user profile relating to the mobile node in the home server may be carried out during an authentication of the mobile node, for example, within the framework of an attachment procedure.

The home server may be a home authentication authorization and accounting (H-AAA) server and/or a home subscriber server (HSS).

The first and second radio access networks may be based on the same radio access technology or different radio access technologies.

If, by contrast with the above mentioned situation, the second radio access network has no connectivity to the first gateway, but only to the second gateway, then the second gateway would be assigned as a local anchor for the mobile node after the latter has moved to the second radio access network, irrespective of the fact that the indication of the first gateway may be retrieved from the user profile relating to the mobile node in the home server.

The invention also involves a home server adapted to being part of a wireless system further comprising at least first and second radio access networks and at least first and second gateways, each of the first and second gateways being capable of acting as a serving gateway. In this wireless system, each of the first and second radio access networks is connected to the first gateway and the second radio access network is also connected to the second gateway. This wireless system also includes at least one mobile node, which initially has a radio link with the first radio access network. Within the context of this wireless system, the home server comprises:

a memory adapted to storing a user profile relating to the mobile node with an indication of the first gateway; and means for returning the indication of the first gateway from said memory, said means being responsive to the detection of the mobile node moving to the second radio access network.

The invention further involves a wireless system for implementing the above mentioned method for achieving local anchoring of a mobile node.

The inventive wireless system comprises at least first and second radio access networks, at least first and second gateways, each of the first and second gateways being capable of acting as a serving gateway, and a home server. In this wireless system, each of the first and second radio access networks is connected to the first gateway, and the second radio access network is also connected to the second gateway. The home server is adapted to store a user profile relating to a mobile node that initially has a radio link with the first radio access network. The wireless system further comprises:

means for assigning the first gateway as a local anchor for the mobile node;

means for updating the user profile relating to the mobile node in the home server with an indication of the first gateway;

and responsive to the detection of the mobile node moving to said second radio access network, means for retrieving the indication of the first gateway from the user profile relating to the mobile node in the home server; and means for keeping the first gateway assigned as a local anchor for the mobile node, based on the retrieved indication of the first gateway.

The preferred features of the above aspects which are indicated by the dependent claims may be combined as appropriate, and may be combined with any of the above aspects of the invention, as would be apparent to a person skilled in the art.

DETAILED DESCRIPTION OF PREFERRED EMBODIMENTS

The above mentioned publications TS 23.401, TS 23.402, TS 29.060, Internet-Draft "Proxy Mobile IPv6" and RFC 3775 are incorporated herein by reference.

Figure 1:
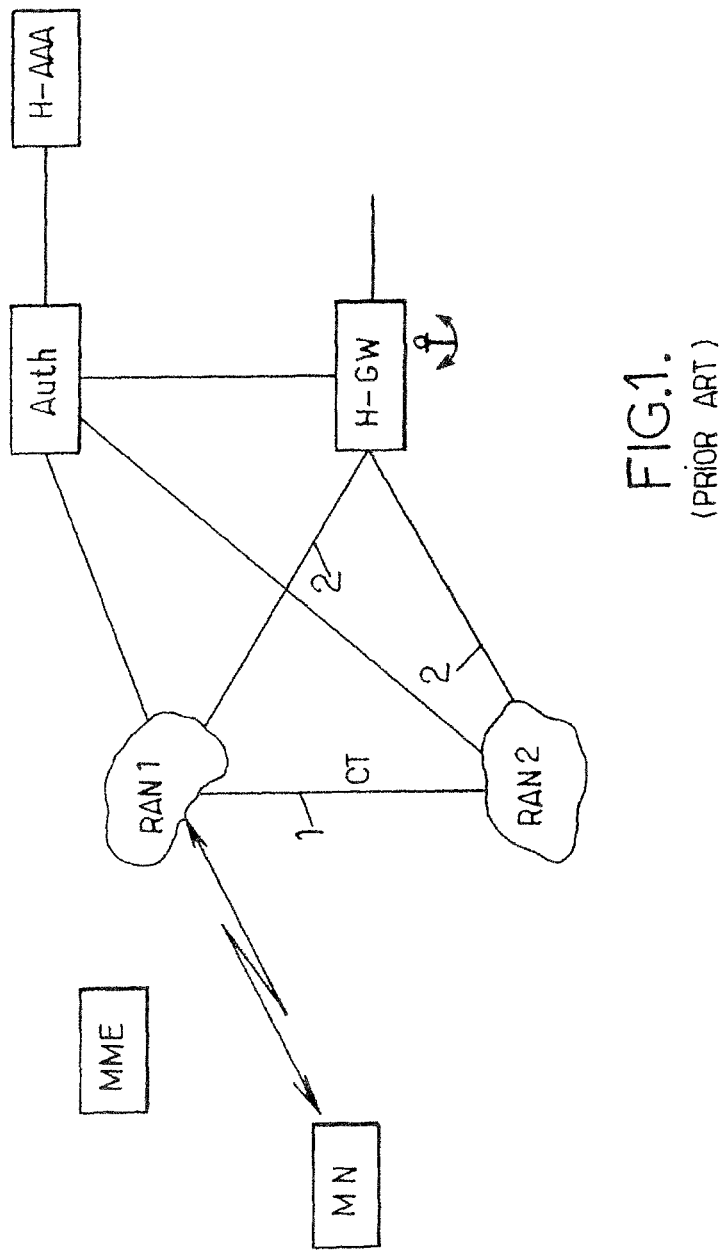
FIG. 1 depicts a local anchoring using a network-based mobility management mechanism in a non-hierarchical manner according to the prior art.
Figure 2:
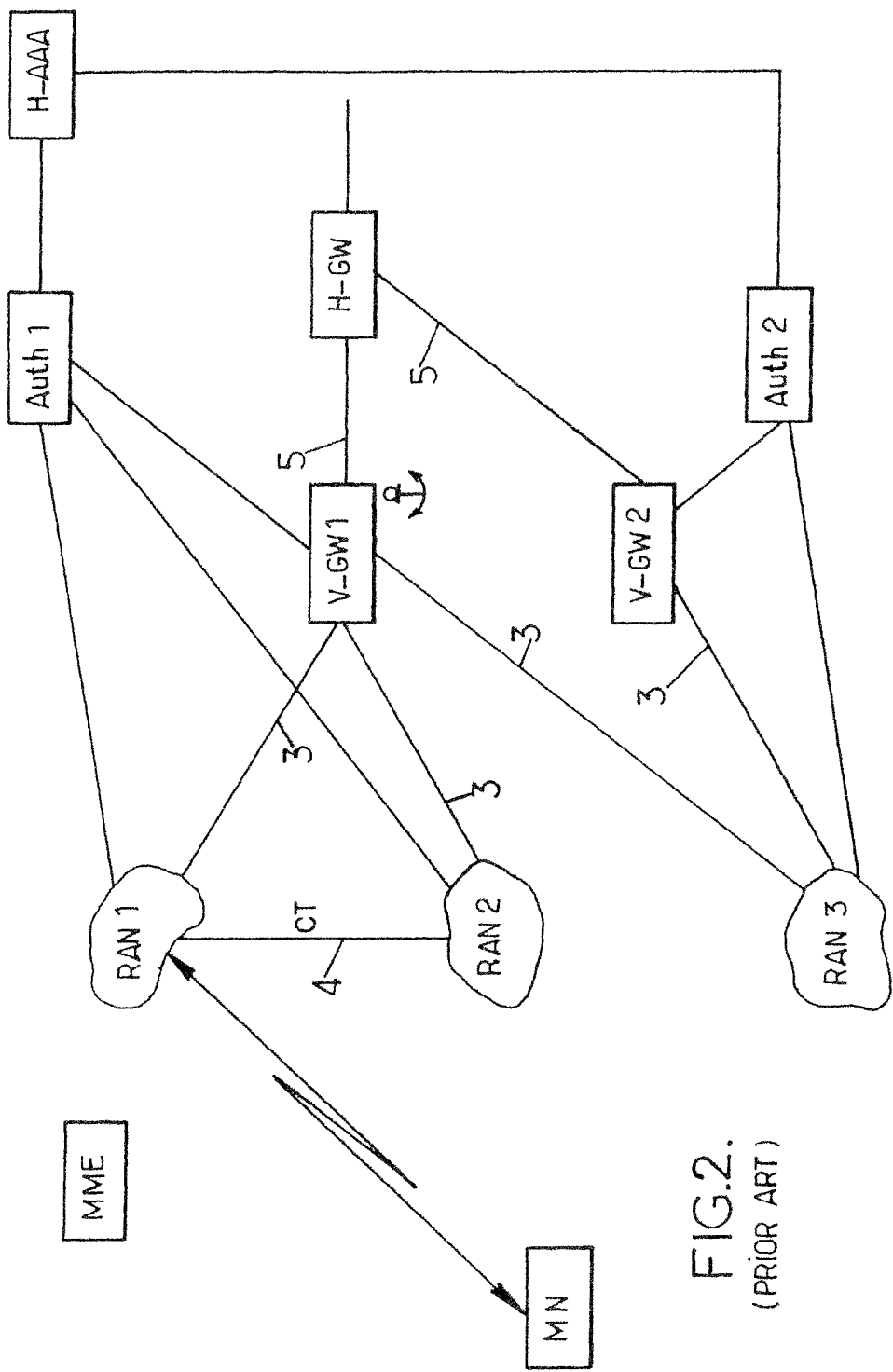
FIG. 2 depicts a local anchoring using a network-based mobility management mechanism in a hierarchical manner according to the prior art.
Figure 3:
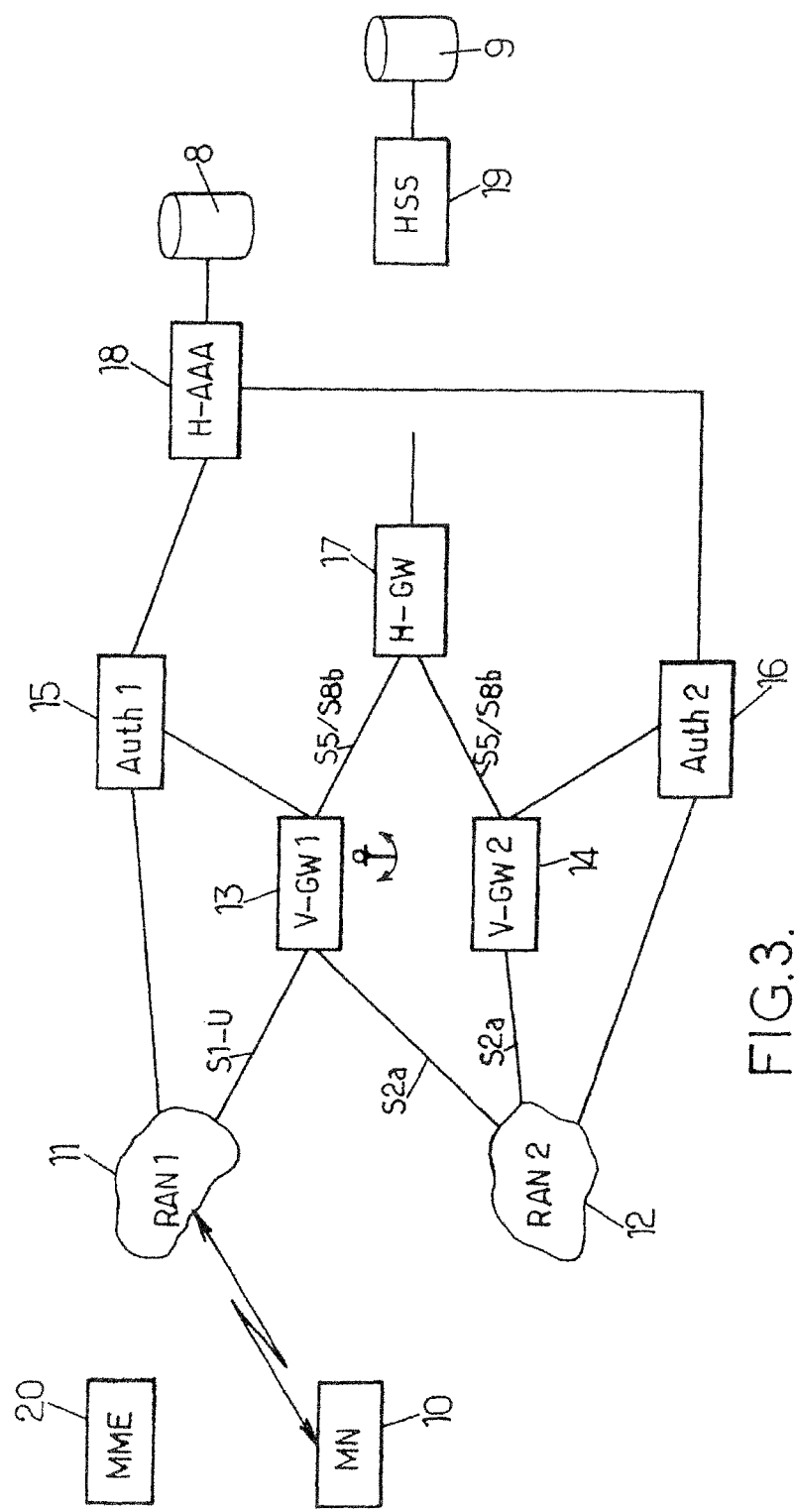
FIG. 3 depicts an exemplary local anchoring using a network-based mobility management mechanism in a hierarchical manner according to the invention.

FIG. 3 shows a wireless system comprising two radio access networks RAN1 11 and RAN2 12 and two gateways, V-GW1 13 and V-GW2 14, each capable of, and adapted to, acting as a serving gateway. This wireless system may also comprise more than two radio access networks and/or more than two gateways.

Both RAN1 11 and RAN2 12 are connected to the gateway V-GW1 13, which may belong to a first subsystem. And RAN2 12 only is connected to the gateway V-GW2 14, which may belong to a second subsystem.

RAN1 11 and RAN2 12 may be based on the same radio access technology or different technologies.

As a non limiting example, RAN1 11 may be a 3GPP radio access network comprising one or several eNode-B (eNB) and RAN2 12 may a non-3GPP radio access network (e.g. Wimax, CDMA2000, etc.). No context transfer (CT) interface (direct or through one or several MMEs) need be provided between RAN1 11 and RAN2 12, although the invention may also apply in the presence of such a CT interface.

In such situation, and in accordance with the above mentioned TS 23.401 and TS 23.402, it is likely that the S1-U interface between RAN1 11 and V-GW1 13 will use GTP and that the S2a interface between RAN2 12 and V-GW1 13 (or RAN2 12 and V-GW2 14) will use PMIP as a network-based mobility management mechanism. The interfaces S5/S8b between V-GW1 13 and H-GW 17 and V-GW2 14 and H-GW 17 can use any protocol of PMIP and GTP as a network-based mobility management mechanism. Of course, any other combination may be suitable as well within the framework of the present invention as would be apparent to one skilled in the art. Also, network-based mobility management mechanisms other than PMIP or GTP would be suitable as well.

In the system of FIG. 3, the network-based mobility management mechanisms are used in a hierarchical manner.

Therefore, the anchoring is with a visited serving gateway rather than with the home gateway. The visited serving gateway is thus the one that contains the LMA functionality facing the radio access networks, each including a MAG functionality. In addition, it contains a MAG functionality facing the H-GW 17.

The system further comprises a home server, which can be a home authentication authorization and accounting server H-AAA 18 and/or a home subscriber server HSS 19 (as defined in the above mentioned TS 23.402).

It also includes authentication functionality, embedded in each one of Auth1 15 and Auth2 16 in the illustrated example. Auth1 15 and Auth2 16 can relate to fully-fledged devices or simply to the authentication functionality which would be implemented in other devices or even distributed between different devices. So, although Auth1 15 and Auth2 16 have been represented as independent entities in FIG. 3, the authentication functionality may actually be part of an MME for Auth1 15 and of RAN2 12 for Auth2 16 for example. Of course, many other examples would be suitable as well, as would be apparent to one skilled in the art.

As shown in FIG. 3, the system may also include a home gateway H-GW 17 and a mobility management entity MME 20.

It is assumed that the MN 10 has a radio link with RAN1 11 initially.

V-GW1 13 is first assigned as a local anchor for the MN 10. This may be carried out during an authentication of the MN 10. In this case, the MN 10 may be authenticated with the H-AAA 18 via the authenticator Auth1 15 within the framework of an attachment procedure for instance. During the access authentication procedure, e.g. by the H-AAA 18 and/or by Auth1 15, H-GW 17 is dynamically assigned to the MN 10. Moreover, Auth1 15 selects V-GW1 13 as a local mobility anchor. It also provides V-GW1 13 with an MN 10 identifier and a H-GW 17 address and sends a V-GW1 13 address to RAN1 11.

It will be noted that any other mechanism for assigning V-GW1 13 as a local anchor for the MN 10 may be used. As an example, a static association between RAN1 11 and V-GW1 13 would be suitable.

For registration of the MN 10, RAN1 11, which has a MAG functionality, establishes connectivity to V-GW1 13 on behalf of the MN 10, for instance by sending a binding update message to V-GW1 13. V-GW1 13 then establishes connectivity to H-GW 17, for instance by forwarding the binding update message to H-GW 17.

This initial attachment procedure substantially corresponds to the one detailed in section 5.4.2.4.3 of the above mentioned TS 23.402, where MN 10 corresponds to the UE (User Equipment), V-GW1 13 is the Serving GW and H-GW 17 is the PDN GW.

At the end of this procedure, tunnels are established between RAN1 11 and V-GW1 13 on the one hand, and V-GW1 13 and H-GW 17 on the other hand. Those tunnels ensure connectivity between the MN 10 and H-GW 17.

Moreover, the home server (the H-AAA 18 and/or the HSS 19) stores, in an associated memory 8 or 9, a user profile relating to the MN 10. It can be noted that copies of this user profile may be temporarily stored in other devices as well (e.g. MME). In this case, the expression "home server" could also encompass such devices by extension.

Once V-GW1 13 has been assigned as a local anchor for the MN 10, the user profile relating to the MN 10 is updated with an indication of V-GW1 13, which may be an address of V-GW1 13 for example. The update may be dynamically performed by Auth1 15.

In addition to said indication of V-GW1 13, other information may be updated in the user profile stored in the memory 8 or 9 of the home server. This other information may be advantageously useful in the target subsystem and can include, e.g., a link-local address of the MAG.

When the MN 10 moves to RAN2 12 (meaning, for purposes of this disclosure, that a new radio link is opened between the MN 10 and RAN2 12, whereas the radio link with RAN1 11 may be closed), the indication of V-GW1 13 is retrieved from the user profile relating to the MN 10 which is stored in the memory 8 or 9 of the home server.

Updating the user profile relating to the MN 10 in the home server with an indication of V-GW1 13 and/or retrieving the indication of V-GW1 13 from the user profile relating to the MN 10 in the home server may be carried out, for example, during the access authentication within the framework of a new attachment procedure of the MN. It may be triggered by Auth2 16 in the target subsystem (which further includes V-GW2 14).

The retrieval of the indication of V-GW1 13 may result from the home server returning said indication during the access authentication procedure.

After having retrieved the indication of V-GW1 13, the system knows that V-GW1 13 was previously assigned as a local mobility anchor for the MN 10. V-GW1 13, which is also connected to RAN2 12, can thus be kept as a local anchor for the MN 10, even after the MN 10 has moved from RAN1 11 to RAN2 12.

Thus, the traffic exchanged by the MN 10 can still be routed via V-GW1 13, rather than via V-GW2 14. Signaling that would otherwise be transmitted and processed by the home gateway H-GW 17 is consequently reduced.

Figure 4:
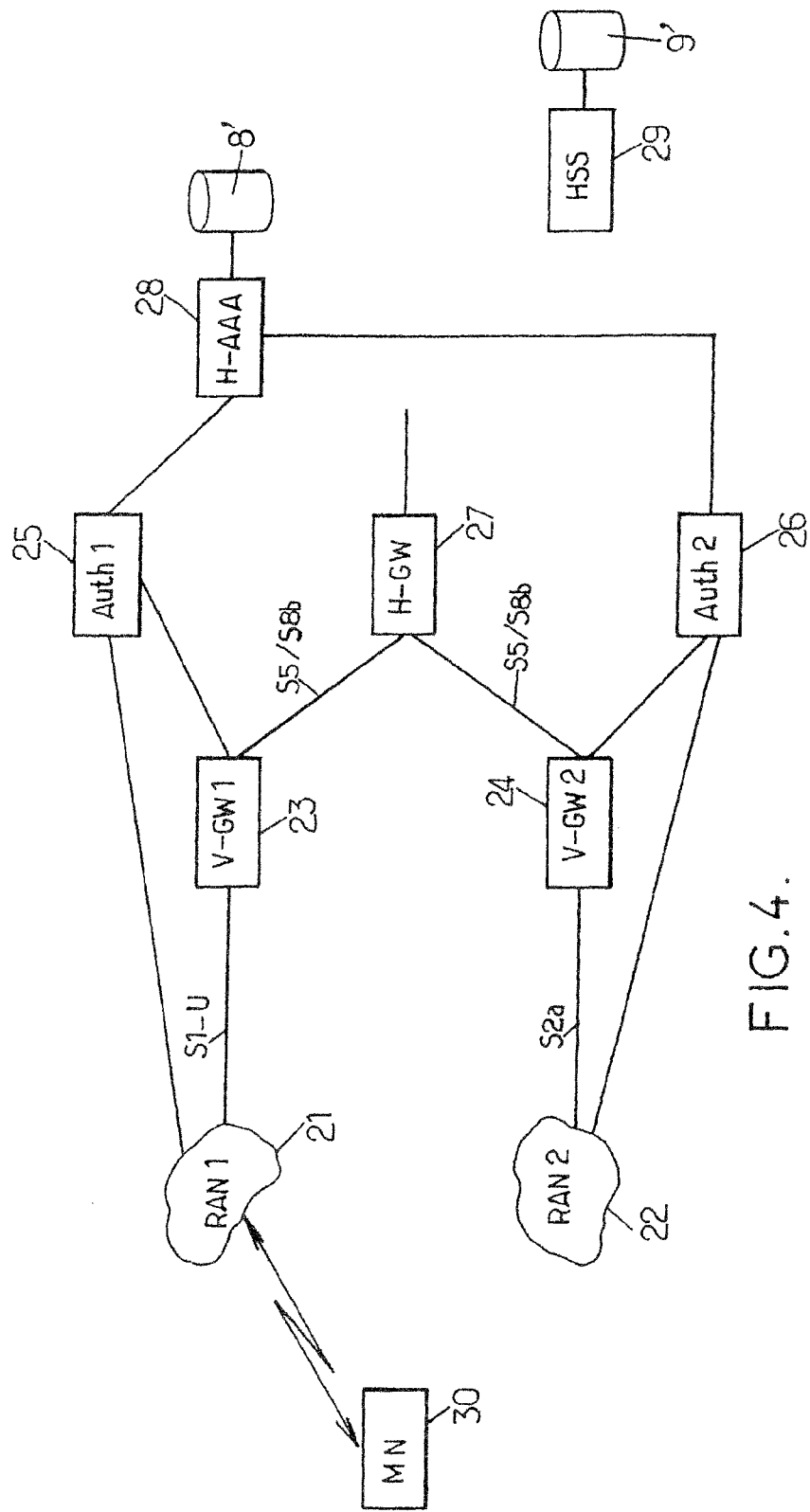
FIG. 4 depicts an exemplary local anchoring using a network-based mobility management mechanism in a hierarchical manner in a case of non-connectivity between the target radio access network and source gateway.

FIG. 4 shows another situation, in which no connectivity exists between RAN2 22 and V-GW1 23. Therefore, RAN2 22 is connected only to V-GW2 24. This situation can occur when there is no full-mesh connectivity between all RANs and V-GWs. This would typically be the case when RAN1 21 and RAN2 22 belong to two different administrative domains or two different geographical regions.

In this case, the first steps are identical to the ones described above with reference to FIG. 3. Then, when the MN 30 moves from RAN1 21 to RAN2 22, it is detected, for example by Auth2 26 in the course of a new access authentication procedure, that the indication retrieved from the user profile relating to the MN 30 stored in the memory 8' or 9' of the home server (H-AAA 28 and/or HSS 29) relates to a gateway, namely V-GW1 23, having no direct connectivity with RAN2 22.

Another gateway, namely V-GW2 24, is therefore assigned to the MN 30, irrespective of the fact that an indication of V-GW1 23 was returned by the home server. And the user profile in the home server is updated with an indication of V-GW2 24, such as an address of V-GW2 24.

We claim:

1. A method for achieving local anchoring of a mobile node in a wireless system comprising at least first and second radio access networks, at least first and second gateways, each of said first and second gateways being capable of acting as a serving gateway, and a home server, each of said first and second radio access networks being connected to said first gateway and said second radio access network also being connected to said second gateway, the mobile node having a radio link with the first radio access network and a user profile relating to the mobile node being stored in the home server, wherein the first radio access network and the second radio access network have no context transfer interface there between, the method comprising the steps of:

assigning the first gateway as a local anchor for the mobile node;
updating the user profile relating to the mobile node in the home server with an indication of the first gateway;
and when the mobile node moves to the second radio access network,
retrieving the indication of the first gateway from the user profile relating to the mobile node in the home server; and
keeping the first gateway assigned as a local anchor for the mobile node, based on the retrieved indication of the first gateway.

2. The method as claimed in claim 1, wherein assigning the first gateway as a local anchor for the mobile node is carried out during an authentication of the mobile node.

3. The method as claimed in claim 1, wherein updating the user profile relating to the mobile node in the home server with an indication of the first gateway and/or retrieving the indication of the first gateway from the user profile relating to the mobile node in the home server is carried out during an authentication of the mobile node.

4. The method as claimed in claim 1, wherein after the first gateway is assigned as a local anchor for the mobile node, the first radio access network establishes connectivity to the first gateway on behalf of the mobile node.

5. The method as claimed in claim 4, wherein the wireless system further comprises a home gateway and wherein the first gateway establishes connectivity to the home gateway.

6. The method as claimed in claim 1, wherein said indication of the first gateway is an address of the first gateway.

7. The method as claimed in claim 1, wherein the home server relates to a home authentication authorization and accounting (H-AAA) server.

8. The method as claimed in claim 1, wherein the home server relates to a home subscriber server (HSS).

9. The method as claimed in claim 1, wherein the first radio access network and the second radio access network are based on the same radio access technology.

10. The method as claimed in claim 1, wherein the first radio access network and the second radio access network are based on different radio access technologies.

11. A home server adapted to being part of a wireless system further comprising at least first and second radio access networks and at least first and second gateways, each of said first and second gateways being capable of acting as a serving gateway, each of said first and second radio access networks being connected to said first gateway and said second radio access network also being connected to said second gateway, and a mobile node having a radio link with said first radio access network, wherein the first radio access network and the second radio access network have no context transfer interface there between, the home server comprising:

a memory adapted to storing a user profile relating to the mobile node; and
means for:
assigning a gateway as a local anchor for the mobile node;
updating the user profile with an indication of the first gateway;
returning the indication of the first gateway from said memory, said means being responsive to the detection of the mobile node moving to the second radio access network; and
keeping the first gateway assigned as a local anchor for the mobile node, based on the indication of the first gateway.

12. A wireless system comprising at least first and second radio access networks, at least first and second gateways, each of said first and second gateways being capable of acting as a serving gateway, and a home server, each of said first and second radio access networks being connected to said first gateway and said second radio access network also being connected to said second gateway, the home server being adapted to store a user profile of a mobile node, wherein the first radio access network and the second radio access network have no context transfer interface there between, the system further comprising, with respect to a mobile node having a radio link with said first radio access network:

means for assigning the first gateway as a local anchor for the mobile node;

means for updating the user profile relating to the mobile node in the home server with an indication of the first gateway;

and responsive to the detection of the mobile node moving to said second radio access network, means for retrieving the indication of the first gateway from the user profile relating to the mobile node in the home server; and means for keeping the first gateway assigned as a local anchor for the mobile node, based on the retrieved indication of the first gateway.

13. The wireless system as claimed in claim 12, wherein the means for assigning the first gateway as a local anchor for the mobile node is activated during an authentication of the mobile node.

14. The wireless system as claimed in claim 12, wherein the means for updating the user profile relating to the mobile node in the home server with an indication of the first gateway and/or the means for retrieving the indication of the first gateway from the user profile relating to the mobile node in the home server are activated during an authentication of the mobile node.

15. The wireless system as claimed in claim 12, wherein the first radio access network comprises means for establishing connectivity to the first gateway on behalf of the mobile node after the first gateway is assigned as a local anchor for the mobile node.

16. The wireless system as claimed in claim 15, wherein the wireless system further comprises a home gateway and wherein the first gateway comprises means for establishing connectivity to the home gateway.

17. The wireless system as claimed in claim 12, wherein said indication of the first gateway is an address of the first gateway.

18. The wireless system as claimed in claim 12, wherein the home server is a home authentication authorization and accounting (H-AAA) server.

19. The wireless system as claimed in claim 12, wherein the home server is a home subscriber server (HSS).

20. The wireless system as claimed in claim 12, wherein the first radio access network and the second radio access network are based on the same radio access technology.

21. The wireless system as claimed in claim 12, wherein the first radio access network and the second radio access network are based on different radio access technologies.

22. A home server adapted to being part of a wireless system further comprising at least first and second radio access networks and at least first and second gateways, each of said first and second gateways being capable of acting as a serving gateway, each of said first and second radio access networks being connected to said first gateway and said second radio access network also being connected to said second gateway, and a mobile node having a radio link with said first radio access network, wherein the first radio access network and the second radio access network have no context transfer interface there between, the home server comprising:

a memory adapted to storing a user profile relating to the mobile node; and processing hardware coupled to the memory, wherein the processor hardware is configured to:

assign a gateway as a local anchor for the mobile node;

updating the user profile with an indication of the first gateway;

return the indication of the first gateway from said memory, said means being responsive to the detection of the mobile node moving to the second radio access network; and keep the first gateway assigned as a local anchor for the mobile node, based on the indication of the first gateway.

\* \* \* \* \*